United States Patent Office 3,350,636
Patented Oct. 31, 1967

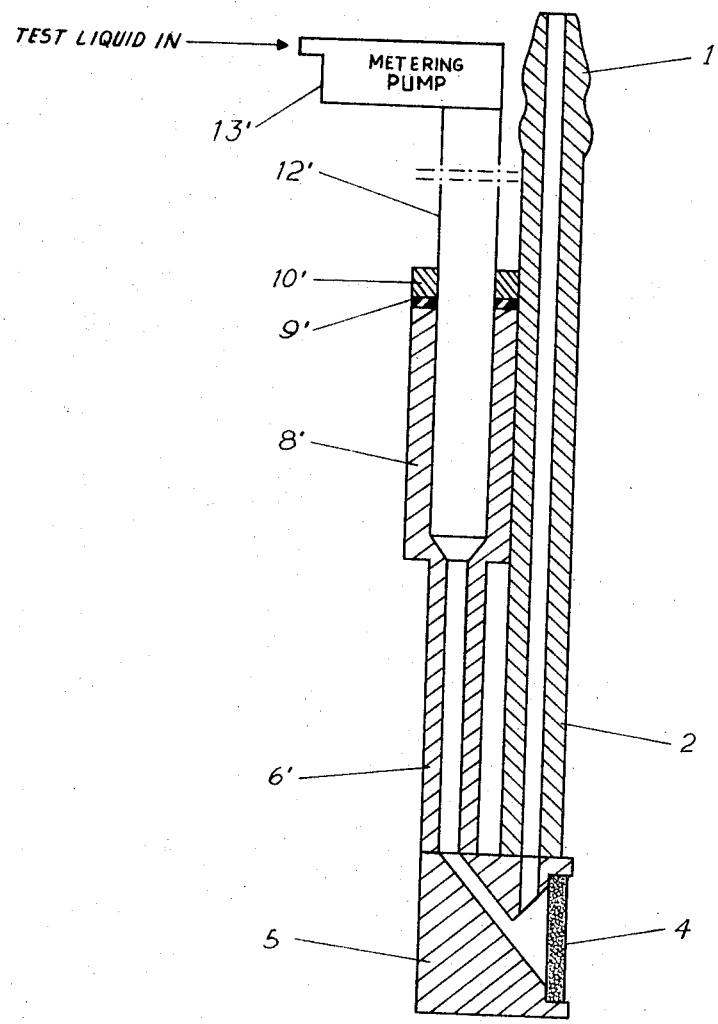

3,350,636
GAS DIFFUSION ELECTRODES AND pH MEASUREMENTS CARRIED OUT THEREWITH
August Winsel, Braunschweig, Germany, assignor to Varta Aktiengesellschaft, Hagen, Westphalia, and Siemens-Schuckertwerke Aktiengesellschaft, Berlin and Erlangen, Germany, both corporations of Germany
Filed Nov. 1, 1962, Ser. No. 234,765
11 Claims. (Cl. 324—30)

This invention relates to new and useful improvements in effecting pH measurements of solutions with gas diffusion electrodes. The invention more particularly relates to an improved process and apparatus for measuring the pH value of a solution with a gas diffusion electrode.

As the pH value is by definition the logarithm of the reciprocal of the hydrogen ion activity, i.e., pH=—log CH+, a hydrogen electrode is the preferred electrode for pH measurements as its potential is directly proportional to the pH value as set forth in Nernst's equation. In spite of this, however, the hydrogen electrode as for example in the form of a platinum hydrogen electrode, is not presently widely used, and other electrodes, such as glass electrodes are preferred. This is due to the long set-up time, very poor loading capacity, sensitivity to poisoning by impurities present in the solutions being measured and last, but not least, the burdensome manipulations required to insure the constant flow of hydrogen gas around the electrode. In recent years gas diffusion electrodes have been developed which do not have the above described disadvantages. These gas diffusion electrodes have a porous electrode body or element which is contacted on one side with the electrolyte and on the other side with the hydrogen gas. The electrolyte penetrates under the influence of capillary forces into the pores of the electrode until it reaches a point where the gas pressure $P_g$ is equal to the capillary pressure.

If the diffusion electrode consists of a finely porous layer on the electrolyte side and a coarsely porous layer on the gas side, a current-generating three-phase boundary between hydrogen gas, electrode and electrolyte is formed at the interphase of the two layers in a pressure range of $P+\sigma/2r_1 > P_g > P+\sigma/2r_2$, wherein $\sigma$ is the surface tension of the electrolyte, $r_1$ the pore radius in the layer on the electrolyte side, $r_2$ the pore radius in the layer on the gas side, and P the hydrostatic pressure in the electrolyte.

These hydrogen diffusion electrodes are capable of adjusting the reversible hydrogen potential and furthermore of supplying even large currents with low polarization so that they do not necessitate measuring instruments of particularly high resistance for the measurement of pH. Furthermore, as two-layer electrodes they do not consume hydrogen above an amount equivalent to the measuring current.

When using these diffusion electrodes for pH measurements however, an extremely long equalization period is required before the electrode will give an adequate indication when changed from one solution to another. This is due to the fact that the electrode pores fill with the electrolyte and when the electrode is contacted with a new solution to be measured the readjustment of the concentration gradient in the electrode proceeds extremely slowly, and for a long time an activity prevails at the three-phase boundary that differs from the hydrogen ion activity of the new solution so that an erroneous pH value is indicated, as it is the activity at the three-phase boundary which determines the value indicated by the electrode.

One object of this invention is to overcome this disadvantage. This and still further objects will become apparent from the following description read in conjunction with the drawings in which:

FIG. 1 shows a vertical section of an embodiment of an electrode in accordance with the invention, FIG. 2 shows a pH measuring arrangement including a measuring electrode in accordance with the invention together with a normal calomel electrode as counterelectrode, FIGS. 3 and 4 show curves of the potential as a function of time and concentration respectively of potassium carbonate and potassium bicarbonate solutions, and FIG. 5 shows a vertical section of a modified embodiment of an electrode arrangement in accordance with the invention using a metering pump.

In accordance with the invention it has been discovered that the above mentioned disadvantages encountered in the use of diffusion electrodes, particularly hydrogen diffusion electrodes, for pH measurements may be effectively avoided, and that this type of electrode may be used to quickly and accurately determine the pH value of different solutions if initially prior to the measurement a quantity of the solution to be tested is forced through the pores of the electrode. In order to force a quantity of the solution to be tested through the pores of the electrode, a portion of the solution to be measured may be sucked through the pores of the electrode into the gas chamber under the hydrostatic pressure of the electrolyte by reducing the gas pressure behind the electrolyte. This portion of the solution which so collects behind the electrode may either be forced back through the electrode by restoring the working pressure of the hydrogen gas, or may be removed directly from the gas chamber. Alternately and preferably a portion of the solution to be measured is introduced into the gas chamber of the electrode in such a manner that it can completely wet the electrode on the gas side and then be forced through the pores of the electrode under the effect of the pressure difference prevailing at the electrode. When this has been done the three-phase boundary can reestablish itself in the pores of the electrode. The portion of the solution may be introduced into the gas chamber from a container, a pump, or the like.

The second mentioned method has several advantages over the first in that in the first a pump is additionally required to suck the electrolyte into the gas chamber, while the second method can be very simply achieved by equipping the gas chamber with valves, or the like.

Furthermore, in accordance with the first mentioned method the pressure in the electrode has been reduced and, as hydrogen electrodes have the characteristic of adsorbing hydrogen in more or less large quantities until equilibrium is established, a large amount of hydrogen has to be pumped away to reduce the pressure which later, after restoration of the working pressure has to be readsorbed. The time and quantity of hydrogen required for de-adsorption-adsorption is aggravated by the large inner surface which the gas diffusion electrode has. As this de-adsorption-adsorption is not required in the second mentioned method, the object of the invention is not only more simply but also more rapidly achieved by the second mentioned method.

In all other respects the pH measurement is effected in the well known and conventional manner, and any of the known or conventional gas diffusion electrodes, such as hydrogen diffusion electrodes, preferably double skeleton catalyst electrodes, may be used. Double skeleton catalyst electrodes consist of a metallic conductive carrier skeleton with embedded Raney skeleton grains. They are manufactured by mixing a Raney alloy powder with the pulverulent carrier skeleton material. Thereafter the mixture is pressed and sintered. It is also possible to achieve the necessary stability of the electrode body in a one step working operation by sinterpressing. It is a characteristic of this electrode that upon the last step of the manufacturing procedure the inactive component of the Raney alloy is eliminated by means of acid or leaching, thus effecting the activation of the Raney metal grains within the pores of the carrier skeleton.

The carrier skeleton can be made from any electronically conductive metals and alloys, which are resistant against the activation solution as well as against the solutions which are to be measured. Among the alkaline resistant metals particularly nickel and the noble metals may be used and of the acid resistant metals the noble metals are preferred. For pH measurements in the alkaline field particularly Raney nickel is used, while palladium is preferred for the acid field. Silver electrodes with embedded Raney palladium may be used for the entire range of pH values.

FIG. 1 shows an embodiment of an electrode which is particularly useful for effecting the second mentioned method.

1 is a hose connection for connecting the gas tube 2 to the hydrogen supply. This gas tube 2 contains a three-way valve 3 and opens at the bottom into the electrode holder 5 into which the diffusion electrode element 4 is clamped in a known manner. Behind the electrode is a funnel-shaped gas chamber into which tube 6 opens at an angle. Tube 6 is connected through a stopcock 7 with the reservoir 8; this reservoir can in turn be connected through three-way valve 3 with tube 2. Reservoir 8 is closed hermetically at the top by cap 10 and rubber gasket 9, spring 11 having sufficient force to overcome the working pressure prevailing in reservoir 8.

In normal operation, valve 3 is set to provide a passage in the direction of tube 2, but to block the passage to rservoir 8. Stopcock 7 is also in the closed position. If it is desired to measure the pH value of a new solution, cap 10 is opened and reservoir 8 is filled with an amount thereof. Then reservoir 8 is closed, stopcock 7 is opened, and valve 3 is turned to open passage in the direction of tube 2 and in the direction of reservoir 8. The tubes 2 and 6 are then in communication at top and bottom, the solution to be measured runs through tube 6, displacing the gas, into the space behind the electrode and fills said space entirely. Under the influence of the pressure difference prevailing at the electrode, the solution is forced outwardly through the pores. When the rinsing solution has passed through the true potential determined by the pH value of the solution being measured establishes itself in the electrode at the three-phase boundary.

The entire rinsing process, therefore, is performed at a constant working pressure of hydrogen gas in the electrode; only when the solution to be measured is poured into reservoir 8 is a small amount of gas lost.

This apparatus can be modified in many ways. Valve 7 can be replaced by a check valve that closes when a lower pressure prevails in reservoir 8 than in tube 6. Then, when cap 10 is lifted (which can also be replaced by a screw cap), the reservoir 8 is automatically cut off from tube 6, so that the only valve that needs to be operated manually is valve 3.

The apparatus of the invention can also be made automatic by using an injecting pump 13' as shown schematically in FIG. 5 to inject measured amounts of the solution to be measured through delivery pipe 12' into rinsing chamber 8' and in turn tube 6'. Pipe 12' carries the cap 10' sealed at gasket 9' to the top of chamber 8'. In this case, valves 3 and 7 can be eliminated, their functions being assumed by the valves in the metering pump. This variant of the apparatus is especially favorable in the case of the continuous supervision of the pH value of industrial solutions. The metering pump pumps the solution into the rinsing chamber against the gas pressure at regular intervals. From thence it flows into the chamber behind the electrode and is forced by the overpressure of the gas through the electrode into the open. After a short pause the electrode potential indicates the pH value correctly and the pH value is recorded, and immediately the rinsing process can be repeated by the injection of a new solution.

*Example 1*

A device was constructed as shown in FIG. 1, using commercial polymethacrylate. The reservoir 8 had a volume of approximately 6 cc. and inside a cross section of 1 cm.$^2$. The length of the drill hole was 6 cm. The holding device 5 of the electrode also consisted of polymethacrylate and was prepared for installation of the electrode disk 4 which had a cross sectional area of 1 cm.$^2$. Holding device 5 and reservoir 8 were connected by nickel tubes of 3 mm. in diameter and leach resistant rubber hoses. Simple pinchcocks served as valves.

The electrodes were manufactured by pressing and sintering at 2500 kg./cm.$^2$. and 400° C. The active layer is a mixture of 1.3 parts by weight of carbonyl nickel powder with a grain diameter of approximately $3\mu$ and 1 part by weight of a pulverulent nickel aluminum alloy w.th a grain diameter of approximately $20\mu$. The exterior layer is a mixture of 1.5 parts by weight of carbonyl nickel powder with a grain diameter of approximately $3\mu$ and 1 part by weight of said pulverulent alloy having a gra n diameter of approximately 3 to $5\mu$. Relating to the geometrical surface of the electrode the weight of the active layer was 1.6 g./m.$^2$ and the weight of the exterior layer was 0.15 g./cm.$^2$. This electrode was activated in boiling 5 N-sodium hydroxide.

The solution to be measured was filled into reservoir 8 and pressed through the electrode as described within a per.od of about 3 minutes. After 2–3 minutes the potential of the electrode differed only up to 5 mv. from the exact value corresponding to a pH difference of 0.08. After a waiting period of 4 minutes the deviation amounts to only 2 mv.

Before filling a new solution to be measured the electrode was rinsed with distilled water.

FIG. 2 shows schematically the measurement arrangement. 12 is the s mplified electrode of FIG. 1 with electrode body 4 in contact with the solution 13 to be measured, so that by reducing the gas pressure in electrode 12, solution 13 will be sucked into the pores of body 4. Of course, electrode 12 may be connected with a pump (not shown) to inject amounts of the solution to be measured thereinto and thence through body 4 as noted above.

A normal calomel electrode 16 is connected by a conductor and a millivoltmeter 17 with the electrode body 4. An electrolyte conductor 14 leads from the normal calomel electrode to the electrolyte 13. The potential can be determ:ned by the millivoltmeter 17. The end of the electrolyte conductor should be nearby the electrode body.

Figure 1:
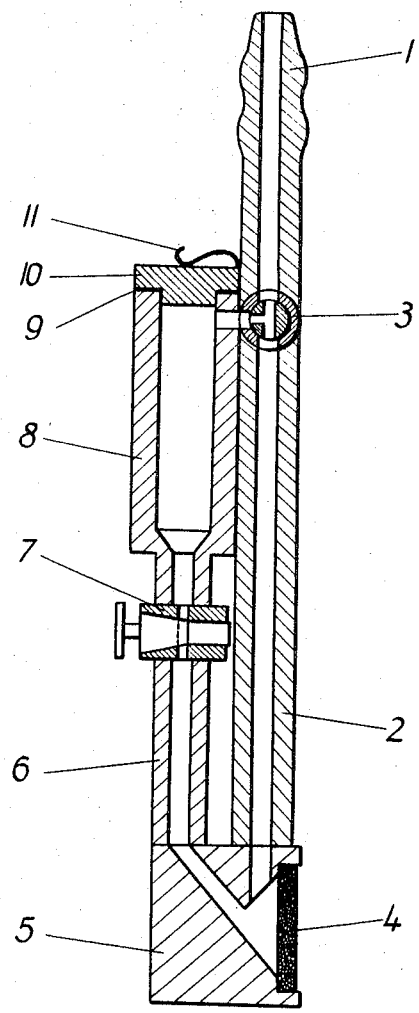
Figure 2:
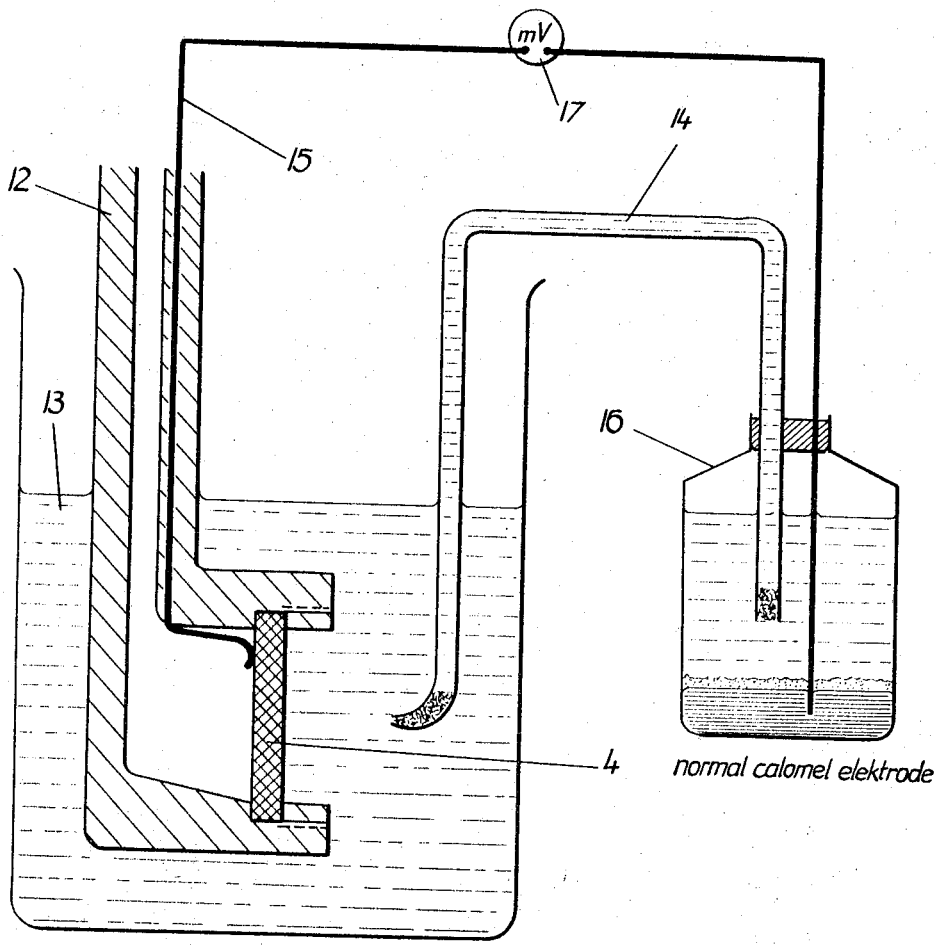
Figure 3:
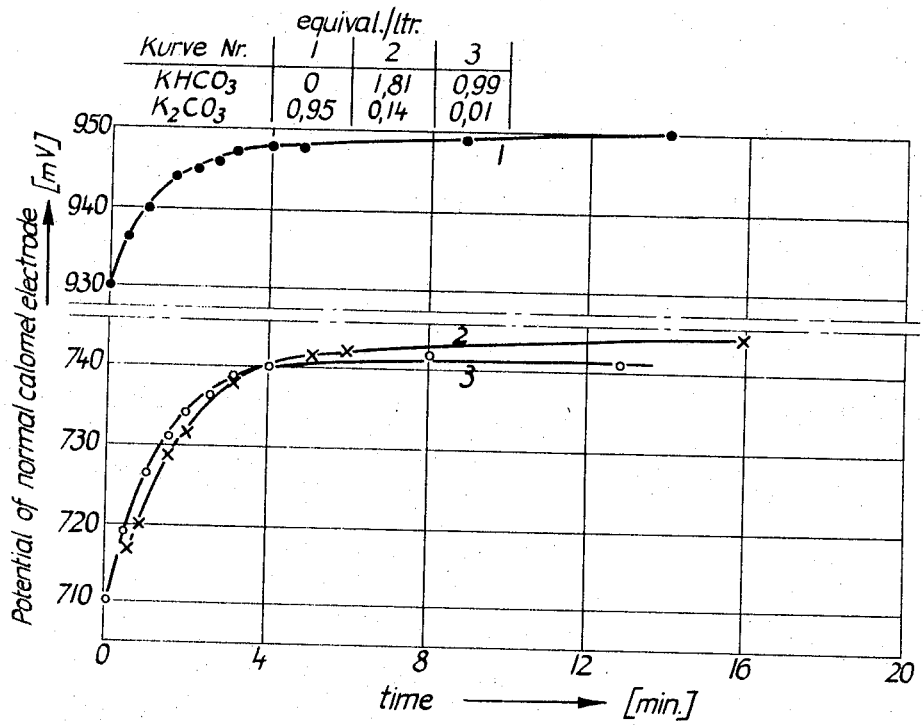
FIG. 3 represents curves showing the temporal values of the potential of aqueous solutions containing potassium carbonate and potassium bicarbonate in various concentrations.
Figure 4:
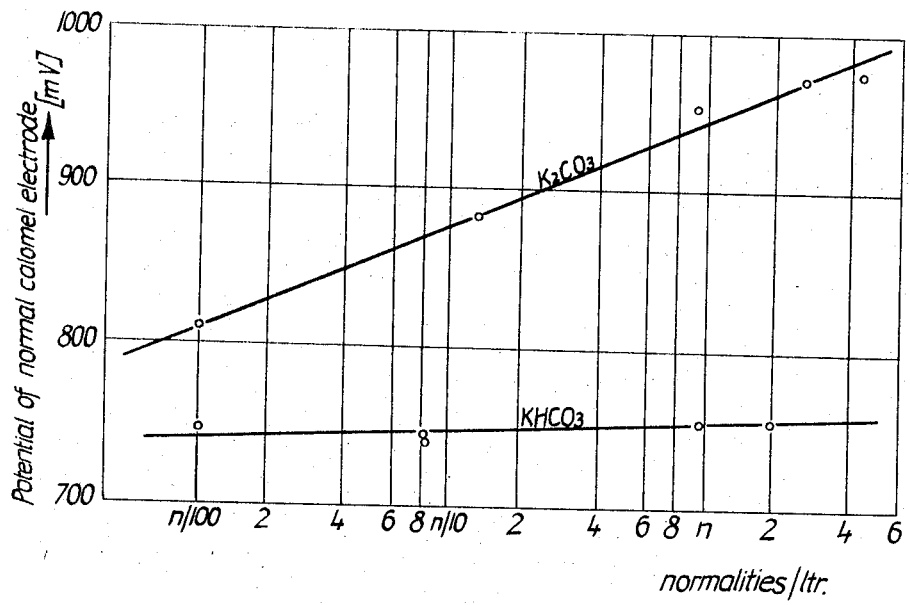
FIG. 4 shows the potential measured as a function of the concentrations of the potassium carbonate and bicarbonate solutions respectively.

Strong leaches, e.g. 5–10 N potass um hydroxide require 2–4 minutes for adapting the electrode. Such time can even be reduced considerably by decreasing the thickness of the electrode and by increasing the porosity, so that the rinsing and measuring operations may be carried out within 3 min., thus requiring no more time than is also necessary for the usual cleaning of the equipment.

The process of the invention can be performed with any desired reference electrode in the usual manner. In particular a hydrogen diffusion electrode in a solution of known hydrogen ion activity can serve as the counter electrode.

While the invention has been described in detail with respect to certain specific embodiments, various changes and modifications which fall within the spirit of the invention and scope of the appended claims will become apparent to the skilled artisan. The invention is thus only intended to be limited by the appended claims or their equivalents wherein I have endeavored to claim all inherent novelty.

I claim:

1. In the process for measuring the pH value of a solution with a porous gas diffusion electrode, the improvement which comprises initially prior to the measurement forcing a quantity of the solution to be measured through the pores of the electrode.

2. Improvement according to claim 1 in which the electrode has a gas chamber therein which is maintained under a hydrogen gas pressure and the solution to be measured is forced through the pores of the electrode by reducing the hydrogen pressure behind the electrode at such gas chamber to thereby suck the solution through the pores.

3. In the process for measuring the pH value of a solution with a porous gas diffusion electrode having a gas chamber behind the porous electrode element, the improvement which comprises initially prior to the measurement introducing a quantity of the solution to be measured into the gas chamber to thereby wet the gas side of the porous electrode element and forcing the solution through the pores of the electrode.

4. Improvement according to claim 3 in which said quantity of the solution to be measured is periodically introduced into said gas chamber.

5. In a porous gas diffusion electrode having a gas chamber behind the porous electrode element and a conduit connecting said gas chamber for the passage of gas to said chamber, the improvement which comprises a second conduit connected to said gas chamber and means for passing a solution through said second conduit, said means for passing such solution being a metering pump.

6. In a porous gas diffusion electrode having a gas chamber behind the porous electrode element and a conduit connecting said gas chamber for the passage of gas to said chamber, the improvement which comprises a second conduit connected to said gas chamber and means for passing a solution through said second conduit including a substantially pressure-tight storage container flow-connected to said second conduit, valve means controlling the flow of liquid from said container to said second conduit and means flow-connecting said container and the first said conduit for supplying gas pressure to said container, said means flow-connecting said container and said first conduit including a three-way valve having a first position of operation allowing fluid flow through said first conduit to said gas chamber and sealing said container from said first conduit, and a second position of operation allowing fluid flow through said first conduit to said gas chamber and said container.

7. In the process for measuring the pH value of a solution with a porous gas diffusion electrode immersed in the solution to be measured, the improvement which comprises initially prior to measurement forcing under the prevailing gas pressure at the electrode a quantity of the given solution to be measured through the pores of the electrode to rinse away rapidly therefrom any residual ions foreign to those in the solution to be measured and to saturate completely said pores and establish therein a concentration gradient consonant with that of the given solution to be measured.

8. Improvement according to claim 7 wherein the electrode is a hydrogen electrode and the prevailing gas pressure is hydrogen gas pressure.

9. In the process for measuring the pH value of a solution with a porous gas diffusion electrode immersed in the solution to be measured, the improvement which comprises initially prior to measurement forcing a quantity of the solution to be measured through the pores of the electrode from the exterior of the electrode at a higher total pressure than that of the gas pressure within the electrode to rinse away rapidly therefrom any residual ions foreign to those in the solution to be measured and to saturate completely said pores and establish therein a concentration gradient consonant with that of the given solution to be measured.

10. Improvement according to claim 9 wherein the prevailing gas pressure is reduced in the electrode whereby such quantity of solution is forced by suction through the pores of the electrode.

11. Improvement according to claim 10 wherein the electrode is a hydrogen electrode and the prevailing gas pressure is hydrogen gas pressure.

References Cited

UNITED STATES PATENTS

| | | | |
|---|---|---|---|
| 2,273,795 | 2/1942 | Heise et al. | 204—98 |
| 2,947,797 | 8/1960 | Justi et al. | 136—86 |
| 3,002,039 | 9/1961 | Bacon | 136—86 |

ARCHIE R. BORCHELT, *Primary Examiner.*

WALTER L. CARLSON, C. F. ROBERTS,

*Assistant Examiners.*